C. B. SHERLOCK AND J. B. MORSE.
CUTTER.
APPLICATION FILED MAR. 18, 1919.
1,340,800.
Patented May 18, 1920.
2 SHEETS—SHEET 2.
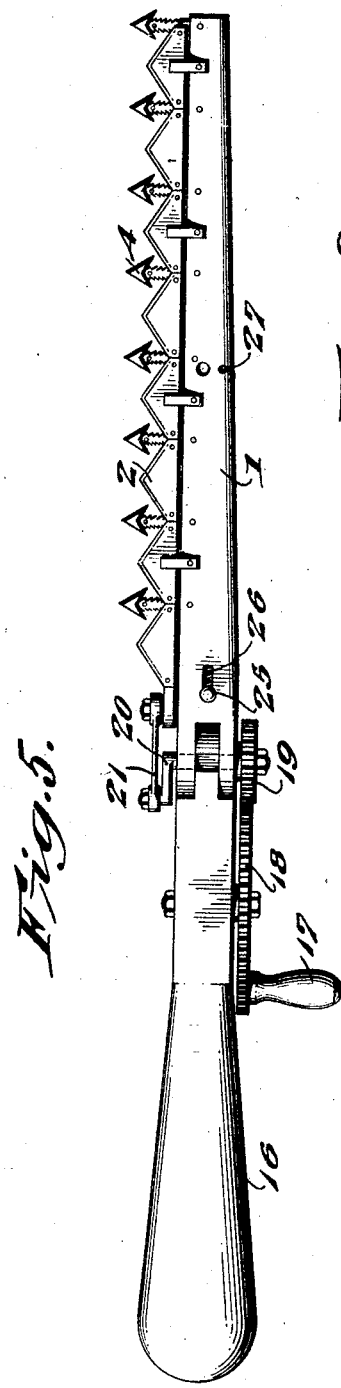
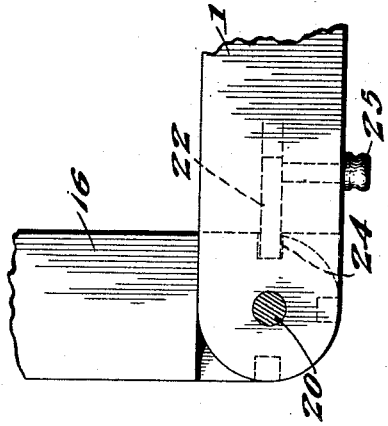
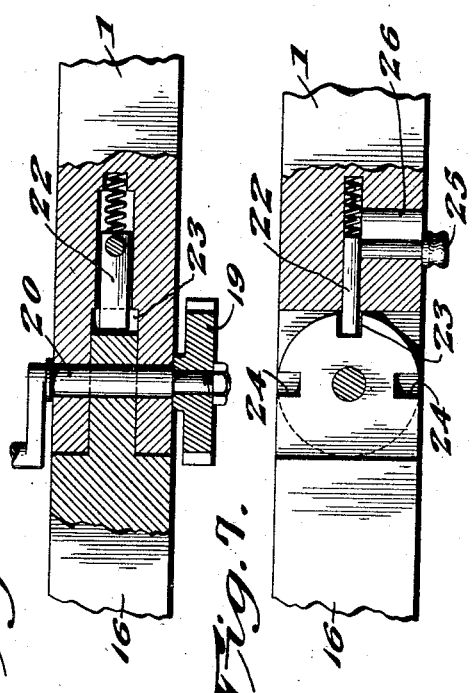
Inventors
Charles B. Sherlock
and John B. Morse
By Vernon E. Hodges
their Attorney

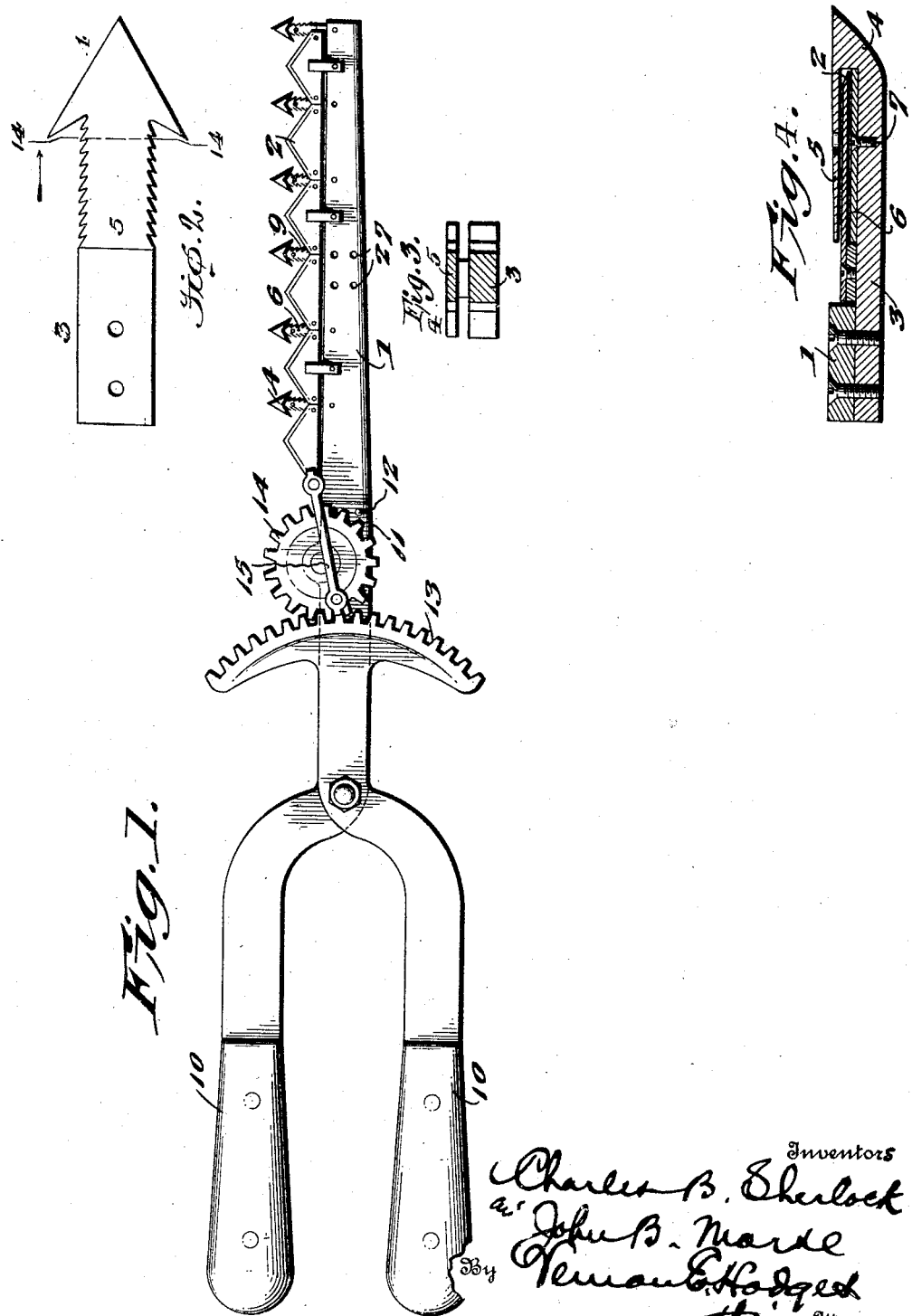

UNITED STATES PATENT OFFICE.

CHARLES B. SHERLOCK AND JOHN B. MORSE, OF WASHINGTON, DISTRICT OF COLUMBIA.

CUTTER.

1,340,800. Specification of Letters Patent. Patented May 18, 1920.

Application filed March 18, 1919. Serial No. 283,413.

*To all whom it may concern:*

Be it known that we, CHARLES B. SHERLOCK and JOHN B. MORSE, citizens of the United States, residing at Washington, in the District of Columbia, have invented certain new and useful Improvements in Cutters, of which the following is a specification.

Our invention relates to an improvement in hand-cutters for grass or hedges.

The object is to provide a light machine which can be easily actuated by the operator and used for mowing grass around the edges of beds, side-walks, and other places, and for trimming hedges and the like; and it consists in a sickle-bar and reciprocating sickle with guards having saw-toothed edges which facilitate the cutting.

It further consists in features that will be more particularly described and pointed out in the claims.

In the accompanying drawings:—

Figure 1 is a plan view showing one form of our cutter;

Fig. 2 is a full-size view in plan of one of the guards;

Fig. 3 is a transverse section on line 14—14 of Fig. 2;

Fig. 4 is a longitudinal sectional view of a form of guard;

Fig. 5 shows another form in which the cutter might be made;

Fig. 6 is an enlarged sectional view through the joint;

Fig. 7 is a plan view of the same;

Fig. 8 is a view corresponding to Fig. 9 showing a slight change in adjustment.

Referring to Fig. 1, the numeral 1 represents the sickle-bar, and 2, the reciprocating sickle having the usual cutter-blades commonly used with reciprocating cutter-bar mowing machines. The numeral 3 represents the guard having a spear-point 4 at one end, which may be extended as shown at 5 in Figs. 2, 3 and 4 to practically reach entirely across the sickle to insure retaining it in its operative position in the sickle-bar.

In the form of our invention shown in Fig. 4, the numeral 6 indicates the guard-plate which is held in place by screws 7, which extends through hole 8 in the guard-plate and into the sickle-guard.

The edges 9 of the guard are toothed or serrated, as shown in Figs. 2 and 3, the purpose of this formation being to facilitate the cutting of the grass, hedge or other object as the sickle reciprocates at a comparatively low speed. Consequently the tendency would be to push the grass, or whatever is being cut away from the blade. These teeth 9 counteract that tendency, and together with the spear-point end hold the grass or other thing being cut back in the path of the blades, thus counteracting this tendency to push away.

While the foregoing features are in common in the various forms in which we have illustrated our invention, we have planned to actuate the sickle in different ways. For instance, in Fig. 1 the handles 10 are of the old form of shear-handles, one adapted to be grasped in each hand and pulled apart and toward each other. The shank 11 of one of these is preferably secured to the sickle-bar by removable screws or bolts 12, and the other handle is provided with the toothed segment 13 in the arc of a circle which engages the teeth of the pinion 14 which turns on the sickle-bar, and has a pitman 15 which extends therefrom to the sickle. This sickle reciprocates as the pinion 14 rotates, thus transforming a rotary motion into a reciprocating motion as the handles are swung in and out.

In another form (as illustrated in Figs. 5, 6, 7, and 8) we have shown a single handle 16 adapted to be grasped in one hand of the operator, and a handle 17 on the large gear 18 in the other, which latter is rotated, imparting motion to the smaller gear 19 on the crank 20, which in turn has a pitman 21 extending to the sickle 2 on the sickle-bar 1. This handle 16 may be projected out in line with the sickle-bar (as shown in Figs. 5, 6 and 7) and held in that position by the spring-actuated latch 22 entering the notch 23, or the handle may be swung at right-angles in either direction (as shown in Fig. 8) when the spring-actuated latch enters one of the notches 24. A knob 25 on the end of this latch is provided as a means for moving it back and forth in the slot 26.

We claim:

1. A sickle-bar guard made in a single piece with a space formed to receive the sickle, and the edges of the guard both above and below the sickle-bar being toothed, and the end terminating in a spear-head.

2. A sickle-bar guard made in a single piece with a space to receive the sickle, the edges both above and below the sickle-bar correspondingly toothed, and the end in the form of a spear.

3. The combination with a sickle-bar and sickle, of a handle pivoted to the end of the sickle-bar, the pivot having a gear on one end and a crank on the other, a pitman extending from the crank to the sickle, a gear rotatable on the handle and meshed with the gear on the pivot, and a lock for securing the handle in alinement with the sickle-bar, or at an angle with respect thereto.

In testimony whereof we affix our signatures.

CHARLES B. SHERLOCK.
JOHN B. MORSE.